(12) United States Patent
Wang

(10) Patent No.: US 12,352,632 B1
(45) Date of Patent: Jul. 8, 2025

(54) TEMPERATURE MEASUREMENT DEVICE

(71) Applicant: Finemold Technologies Co., Ltd, Guangdong (CN)

(72) Inventor: Baohong Wang, Shenzhen (CN)

(73) Assignee: Finemold Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/670,664

(22) Filed: May 21, 2024

(30) Foreign Application Priority Data

May 7, 2024 (CN) .......................... 202410553051.0

(51) Int. Cl.
*G01K 1/12* (2006.01)
*G01K 1/024* (2021.01)

(52) U.S. Cl.
CPC .............. *G01K 1/12* (2013.01); *G01K 1/024* (2013.01); *G01K 2207/06* (2013.01); *G01K 2215/00* (2013.01)

(58) Field of Classification Search
CPC ...... G01K 1/024; G01K 1/12; G01K 2207/06; G01K 2215/00
See application file for complete search history.

(56) References Cited

U.S. PATENT DOCUMENTS

| 8,410,753 | B2 * | 4/2013 | Opolka | H02J 7/0042 |
| | | | | 320/114 |
| 2020/0096393 | A1 * | 3/2020 | Lion | G01K 3/10 |
| 2022/0049992 | A1 * | 2/2022 | Nivala | G01K 1/024 |
| 2022/0381624 | A1 * | 12/2022 | Young | G01K 3/14 |
| 2024/0167892 | A1 * | 5/2024 | Xie | G01K 7/16 |

FOREIGN PATENT DOCUMENTS

CN 106989842 A * 7/2017

* cited by examiner

*Primary Examiner* — John E Breene
*Assistant Examiner* — Janice M Soto
(74) *Attorney, Agent, or Firm* — Ricky Lam

(57) ABSTRACT

A temperature measurement device provided in the present application, wherein the temperature measurement device comprises a temperature probe, wherein the temperature probe comprises: a cylinder and a handle, wherein the handle has a distal opening away from the cylinder and a proximal opening detachably connected to the cylinder, a cross-sectional area of the handle gradually decreases from the distal opening to the proximal opening, the bottom of the proximal opening is provided with a first step that extends radially inward, and the inner diameter Rd of the distal opening is greater than the inner diameter Rp of the first step, the cylinder comprises a tip for inserting into food, a cylindrical portion, and an upper end opposite to the tip, the upper end has a second step that is connected to the cylindrical portion and extends radially outward.

15 Claims, 7 Drawing Sheets

TEMPERATURE MEASUREMENT DEVICE

CROSS-REFERENCE TO RELATED APPLICATIONS

The application claims the priority of a Chinese patent application CN 202410553051.0 with a filing date on May 7, 2024, and its entire content is incorporated by reference into the application.

FIELD

The present application relates to the field of temperature measurement, more specifically, to a temperature measurement device.

BACKGROUND

A temperature measurement device plays an important role in controlling the cooking temperature and heat of food. Due to the small volume of thermometers or temperature probes in temperature measurement device, the traditional temperature measurement device has problems such as poor high-temperature resistance, insufficient battery capacity, difficulty in use, and low level of intelligence. The temperature probe of the temperature measurement device in the present application does not require a foolproof design in structure, and users do not need to consider the angle and direction of insertion when placing the temperature probe into the slot of the repeater for charging. The connection between the metal body and the handle of the temperature measurement device of the present application prevents the metal body from falling off the handle during use, and the temperature measurement device of the present application can better manage the electrical energy consumption of the temperature probe, avoid frequency charging, and reduce the battery life of the temperature probe.

SUMMARY

The present application proposes a temperature measurement device that solves the problems of poor high-temperature resistance, insufficient battery capacity, difficulty in use, and low level of intelligence of the traditional temperature measurement devices.

According to one aspect of the present application, a temperature measurement device is provided, wherein the temperature measurement device comprises a temperature probe, wherein the temperature probe comprises:

a cylinder and a handle, wherein the handle has a distal opening away from the cylinder and a proximal opening detachably connected to the cylinder, a cross-sectional area of the handle gradually decreases from the distal opening to the proximal opening, the bottom of the proximal opening is provided with a first step that extends radially inward, and the inner diameter $R_d$ of the distal opening is greater than the inner diameter $R_p$ of the first step, the cylinder comprises a tip for inserting into food, a cylindrical portion, and an upper end opposite to the tip, the upper end has a second step that is connected to the cylindrical portion and extends radially outward, the diameter $R_s$ of the second step is greater than the diameter $R_c$ of the cylindrical portion, wherein $R_d > R_s > R_p > R_c$.

In one embodiment, wherein when the upper end of the cylinder is connected to the proximal opening of the handle, the second step is in contact with the first step.

In one embodiment, wherein the second step has an external thread, and the proximal opening of the handle has an internal thread that matches the external thread, the internal thread is located above the first step, and the internal thread and the first step form a stop structure of the cylinder.

In one embodiment, wherein the temperature probe further comprises an upper cover connected to the distal opening, wherein the upper cover comprises a first electrode contact, wherein the first electrode contact comprises an peripheral portion, an annular portion, and a circular portion, wherein the annular portion is located between the peripheral portion and the circular portion, wherein the annular portion and the circular portion are made of conductive materials, and the annular portion is made of insulating materials.

In one embodiment, wherein the temperature probe further comprises a first battery, a first communication module, an antenna module, a first electrode, and a second electrode, the antenna module is arranged on a heat-resisting substrate circuit board, the antenna module is located inside the handle, and one end of the first electrode and the second electrode are respectively electrically connected to the heat-resisting substrate circuit board, the first electrode and the second electrode are respectively electrically connected to the peripheral portion and the circular portion.

In one embodiment, wherein the cylinder comprises an indicator line, and a portion from the indicator line to the tip is inserted into the food during temperature measurement.

In one embodiment, wherein one or more accommodating cavities are provided at one end of the peripheral portion near the heat-resisting substrate circuit board, and the accommodating cavities are configured to accommodate the first electrode.

In one embodiment, wherein the first electrode is an elastic clip used to clamp the heat-resisting substrate circuit board.

In one embodiment, wherein the second electrode is a U-shaped clamping arm, and the second electrode and the first electrode are configured to fix the heat-resisting substrate circuit board.

In one embodiment, wherein the temperature probe further comprises one or more food temperature sensors, which are electrically connected to the heat-resisting substrate circuit board and extended to an inner wall of the cylinder.

In one embodiment, wherein when there are multiple food temperature sensors, the food temperature sensors are positioned at different heights of the cylinder.

In one embodiment, wherein the food temperature sensor comprises an elastic arm connected to the heat-resisting substrate circuit board and a sensing unit connected to the elastic arm, wherein the sensing unit is close to or abuts against the inner wall of the cylinder.

In one embodiment, wherein the temperature measurement device further comprises a repeater detachably connected to the temperature probe, wherein the repeater is configured to charge the temperature probe, receive data transmitted from the temperature probe and then perform data processing, and transmit control instructions from the repeater to the temperature probe, the repeater has one or more slots for accommodating the temperature probe, the repeater has a processor, a memory, and a second communication module, the first communication module is communicated with the second communication module, and the multiple food temperature sensors transmit the measured temperature to the second communication module and the processor through the first communication module and the antenna module, the processor processes the temperature by a temperature algorithm stored in the memory.

In one embodiment, wherein the temperature probe further comprises an environment temperature sensor, which is located at the upper end of the cylinder.

In one embodiment, wherein the food temperature probe and the environment temperature sensor transmit the measured temperature to the second communication module and the processor through the first communication module and antenna module, and the processor processes the temperature through a maturity prediction algorithm stored in the memory.

In one embodiment, wherein the repeater further comprises a temperature probe warehousing sensor, wherein the temperature probe warehousing sensor is configured to recognize an electrical level change and output a temperature probe warehousing signal when the temperature probe is placed back in the slot, and transmit the temperature probe warehousing signal to the processor to turn off the first communication module of the temperature probe.

In one embodiment, wherein the slot comprises a second electrode contact matched with the peripheral portion and the circular portion respectively, the repeater comprising a second battery, and the second battery is electrically connected to the first battery through the second electrode contact, the peripheral portion, and the circular portion.

In one embodiment, the heat-resisting substrate circuit board is a ceramic substrate circuit board or a heat-resisting polymer material substrate circuit board.

According to another aspect of the present application, a temperature measurement device is provided, wherein the temperature measurement device comprises a temperature probe, wherein the temperature probe comprises:

a cylinder and a handle, wherein the handle has a distal opening away from the cylinder and a proximal opening detachably connected to the cylinder, a cross-sectional area of the handle gradually decreases from the distal opening to the proximal opening, the bottom of the proximal opening is provided with a first step that extends radially inward, and the inner diameter $R_d$ of the distal opening is greater than the inner diameter $R_p$ of the first step, the cylinder comprises a tip for inserting into food, a cylindrical portion, and an upper end opposite to the tip, the upper end has a second step that is connected to the cylindrical portion and extends radially outward, the diameter $R_s$ of the second step is greater than the diameter $R_c$ of the cylindrical portion, wherein $R_d > R_s > R_p > R_c$, the temperature measurement device further includes a repeater detachably connected to the temperature probe, wherein the repeater is configured to charge the temperature probe, receive data transmitted from the temperature probe, perform data processing, and transmit control commands from the repeater to the temperature probe, the repeater has one or more slots for accommodating the temperature probe, the repeater has a processor, a memory, and a second communication module, the first communication module is communicated with the second communication module, and the multiple food temperature sensors transmit the measured temperature to the second communication module and the processor through the first communication module and the antenna module, the processor processes the temperature by a temperature algorithm stored in the memory.

In one embodiment, wherein the temperature probe further comprises an upper cover connected to the distal opening, wherein the upper cover comprises a first electrode contact, wherein the first electrode contact comprises an peripheral portion, an annular portion, and a circular portion, wherein the annular portion is located between the peripheral portion and the circular portion, wherein the annular portion and the circular portion are made of conductive materials, and the annular portion is made of insulating materials.

In one embodiment, wherein the temperature probe further comprises a first battery, a first communication module, an antenna module, a first electrode, and a second electrode, the antenna module is arranged on a heat-resisting substrate circuit board, the antenna module is located inside the handle, and one end of the first electrode and the second electrode are respectively electrically connected to the heat-resisting substrate circuit board, the first electrode and the second electrode are respectively electrically connected to the peripheral portion and the circular portion.

In one embodiment, the heat-resisting substrate circuit board is a ceramic substrate circuit board or a heat-resisting polymer material substrate circuit board.

Further embodiments of the present application can also achieve other advantageous technical effects not listed one by one, which may be partially described in the following, and can be expected and understood by those skilled in the art after reading the present application.

BRIEF DESCRIPTION OF THE DRAWINGS

In order to provide a clearer explanation of the technical solution in the embodiments of the present application, a brief introduction will be given below to the accompanying drawings required in the embodiments or prior art descriptions. It is evident that the accompanying drawings in the following description are only some embodiments of the present application. For those skilled in the art, other accompanying drawings can be obtained based on these drawings without the need for creative labor.

DETAILED DESCRIPTION

Figure 1:
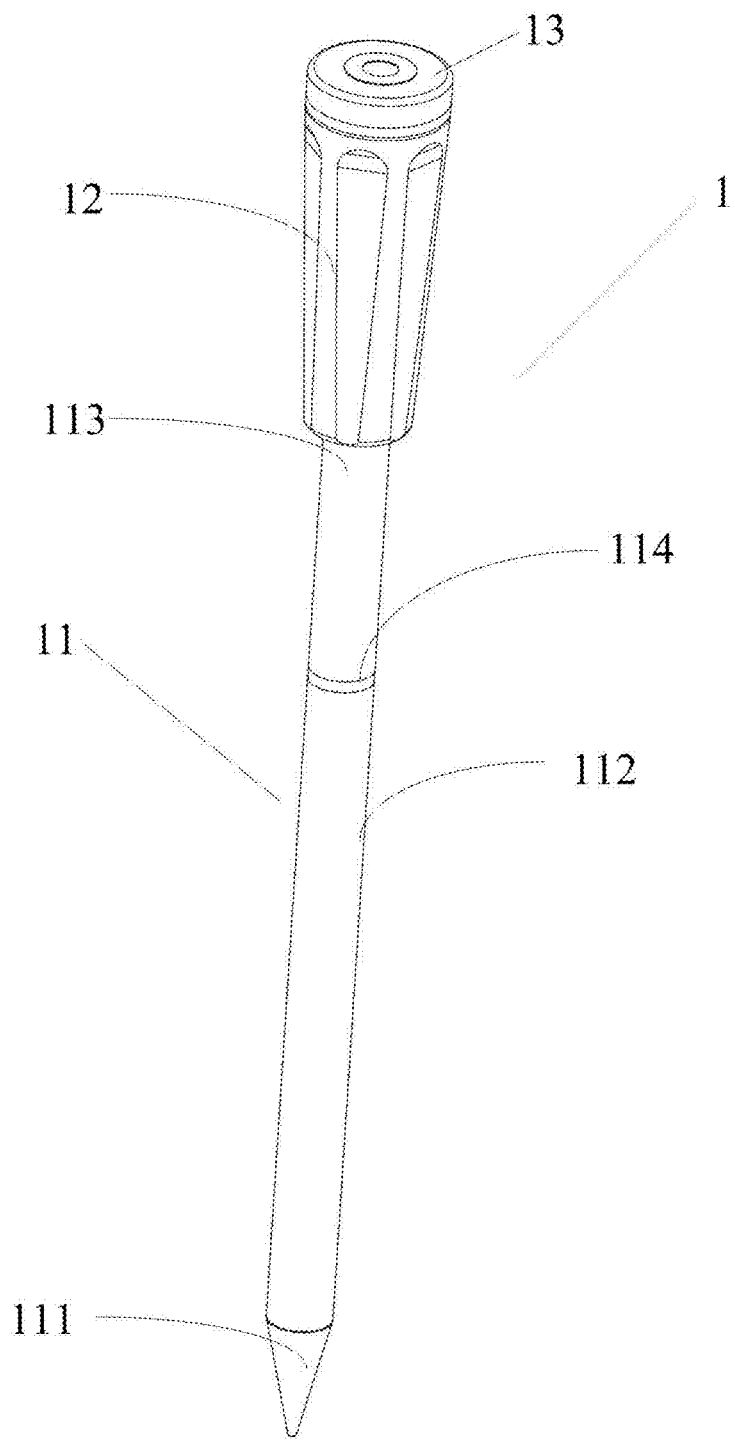
FIG. 1 shows a three-dimensional view of the temperature probe of the temperature measurement device of the present application.

In the following description of the accompanying drawings and specific embodiments, details of one or more embodiments of the present application will be elaborated. From these descriptions, drawings, and claims, other features, purposes, and advantages of the present application can be clearly identified.

It should be understood that the illustrated and described embodiments are not limited to the details of the construction and arrangement of the components illustrated in the following description or in the accompanying drawings in the application. The illustrated embodiments can be other embodiments and can be implemented or executed in various ways. Each example is provided by explaining the disclosed embodiments rather than limiting them. In fact, it will be apparent to those skilled in the art that various modifications and variations may be made to the embodiments of the present application without departing from the scope or substance disclosed herein. For example, features illustrated or described as part of one embodiment may be used in conjunction with another embodiment to still generate another embodiment. Therefore, the present application publicly covers such modifications and variations within the scope of the attached claims and their equivalent elements.

It should be understood that the terms "up", "down", "front", "back", "left", "right", "horizontal", etc. indicate the orientation or position relationship based on the orientation or position relationship shown in the drawings, only for the convenience of describing and simplifying the description of the present application, rather than indicating or implying that the device or component referred to must have a specific orientation, be constructed and operated in a specific orientation, and therefore cannot be understood as a limitation of the present application.

Similarly, it can be understood that the phrases and language used in the present application are for descriptive purposes and should not be considered restrictive. The use of "including", "including" or "having" and their variants in this application is intended to openly include the items listed below, their equivalents, and additional items.

As used in this application, the terms "first", "second", etc. are only used to describe the purpose and cannot be understood as indicating or implying relative importance or implying the quantity of technical features indicated. Therefore, the features limited to "first", "second", etc. may explicitly or implicitly include one or more of these features. In this application, "multiple" means two or more, unless otherwise specified.

As used in this application, the terms "installation", "connection", "connection", "fixed" and other terms should be broadly understood, for example, they can be fixed connections, detachable connections, or integrated connections; It can be a mechanical connection or an electrical connection; It can be directly connected, or indirectly connected through an intermediate medium, or it can be an internal connection between two components. For ordinary technical personnel in this field, the specific meanings of the above terms in this application can be understood based on specific circumstances.

As used in this application, "heat-resisting substrate circuit board" refers to a circuit board that can withstand temperatures above 200° C., preferably between 200-500° C. or 200-400° C.

A more detailed description of the present application will be provided with reference to specific embodiments of the present application below.

FIG. 1 shows a temperature probe 1 of a temperature measurement device, which is elongated and can be used to measure temperature. The temperature probe 1 includes a cylinder 11, a handle 12, and an upper cover 13. The cylinder 11 includes a tip 111 for insertion into food, a cylindrical portion 112, and an upper end 113 opposite to the tip 111. The cylinder 11 can be made of metal materials, and the handle 12 can be made of heat-resisting plastic or ceramic. In one embodiment, the cylinder 11 can be made of multiple parts, wherein the tip 111 of the cylinder 11 is made of metal material. As the metal material is a good conductor of heat, using the metal material as the tip is beneficial to the rapid transfer of heat to the food temperature sensor inside the tip.

Figure 2:
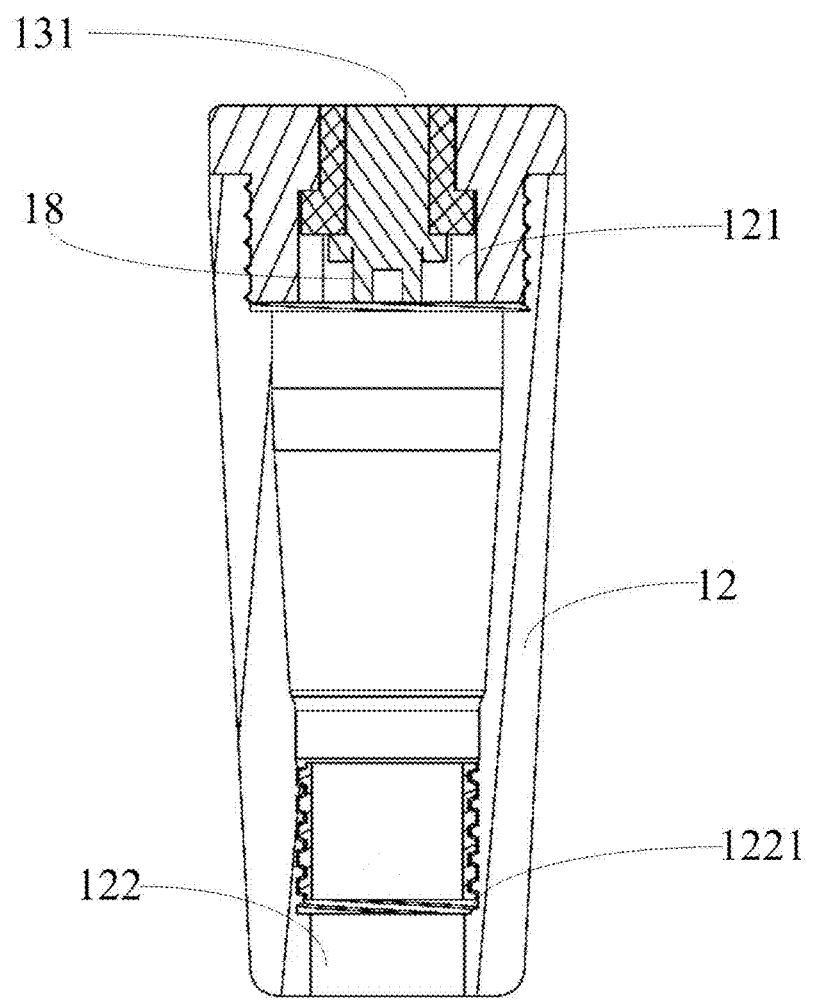
FIG. 2 shows the internal structure of the handle of the temperature probe of the temperature measurement device of the present application.
Figure 4:
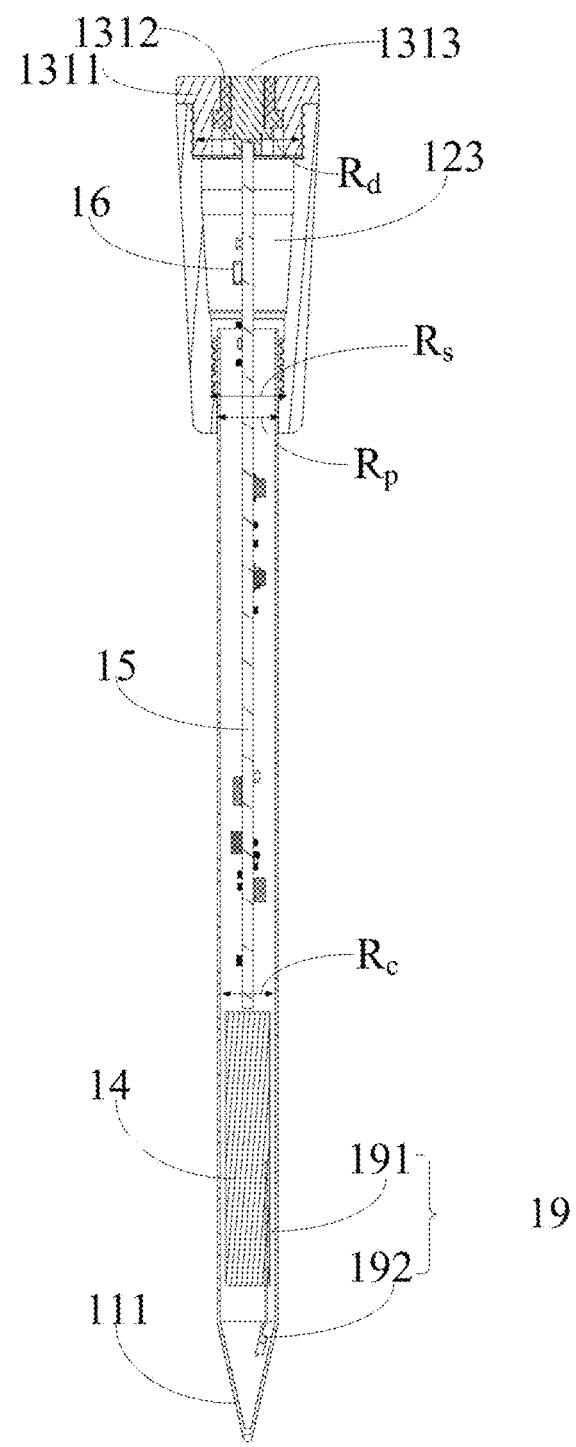
FIG. 4 shows the internal structure of the temperature probe of the present application.

As shown in FIGS. 1, 2, and 4, the handle 12 has a distal opening 121 away from cylinder 11 and a proximal opening 122 detachably connected to cylinder 11. The cross-sectional area of handle 12 gradually decreases from the distal opening 121 to the proximal opening 122. The bottom of the proximal opening 122 has a first step 1221 that extends radially inward, and the inner diameter $R_d$ of the distal opening 121 is greater than the inner diameter $R_p$ of the first step 1221. The temperature probe 1 also includes an upper cover 13 connected to the distal opening 121, which has a first electrode contact 131. The first electrode contact 131 includes a peripheral portion 1311, an annular portion 1312, and a circular portion 1313. The annular portion 1312 is located between the peripheral portion 1311 and the circular portion 1313, and the annular portion 1312 and the circular portion 1313 act as electrode contacts. The annular portion 1312 is made of insulating material. Preferably, the annular portion 1312 is made of ceramic materials or heat-resisting polymer materials.

Figure 3:
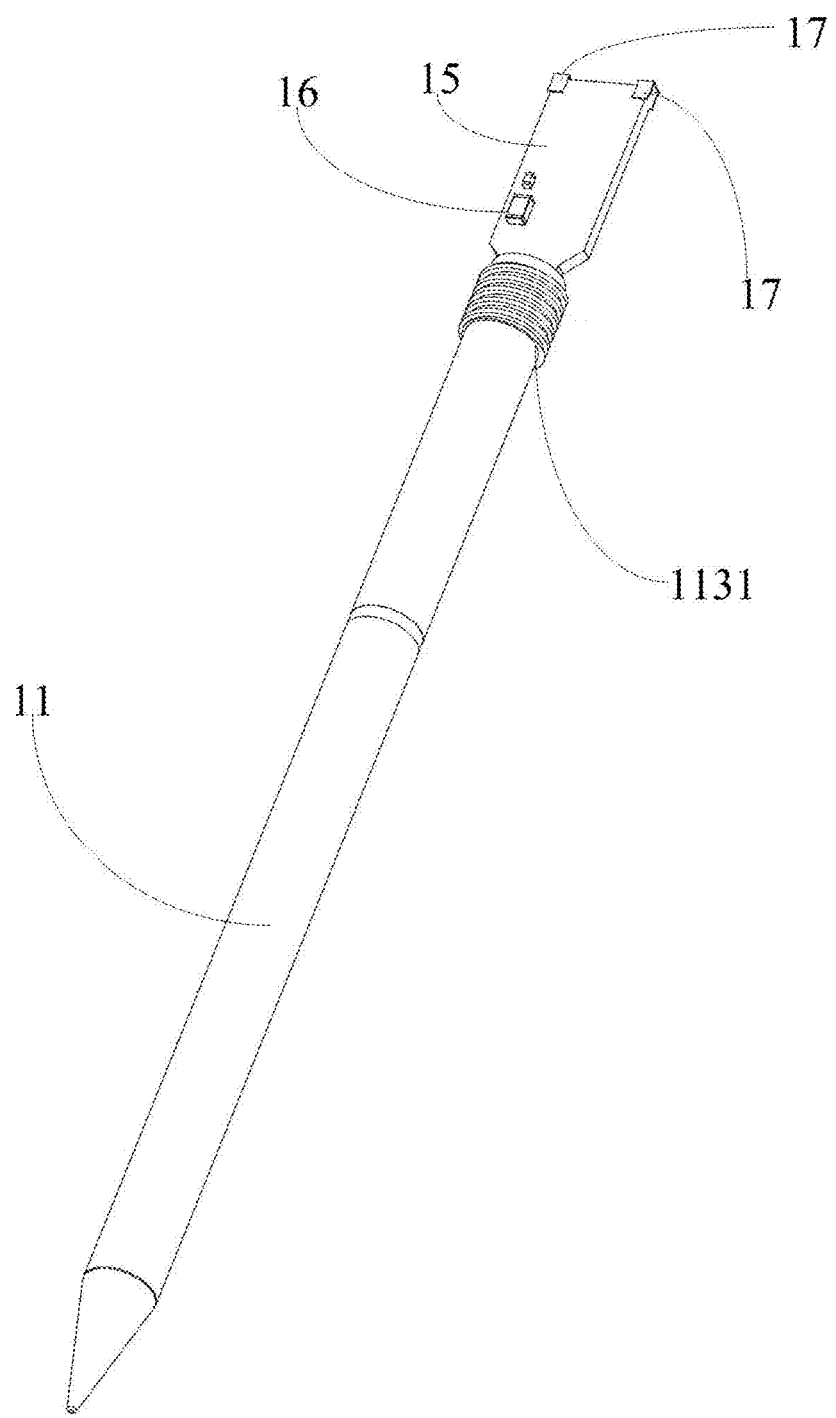
FIG. 3 shows a three-dimensional view of the cylinder and the antenna module of the temperature probe of the present application.

As shown in FIGS. 3 and 4, the upper end 113 has a second step 1131 connected to the cylindrical portion 112 and extending radially outward, the diameter $R_s$ of the second step 1131 is greater than the diameter $R_c$ of the cylindrical portion 112, where $R_d > R_s > R_p > R_c$.

As shown in FIGS. 3 and 4, when the upper end 113 of the cylinder 11 is connected to the proximal opening 122 of the handle 12, the second step 1131 is in contact with the first step 1221. The second step 1131 has an external thread, and the proximal opening 122 of the handle 12 has an internal thread that matches the external thread, the internal thread is located above the first step 1221, and the internal thread and the first step 1221 form the stop structure of the cylinder 11. When installing the cylinder 11 onto the handle 12, the cylinder 11 can enter and pass through the proximal opening 122 through the distal opening 121 of the handle 12. When the upper end 113 of the cylinder 11 is close to the proximal opening 122, the external thread and internal thread are matched and the first step 1221 and the second step 1131 abut.

As shown in FIGS. 3-6, the temperature probe 1 further includes a first battery 14, a first communication module 151, an antenna module 16, a first electrode 17, and a second electrode 18. The antenna module 16 is installed on the heat-resisting substrate circuit board 15 and is located inside the handle 12. Placing antenna module 16 inside handle 12 facilitates the transmission of signals from antenna module 16 from handle 12. Handle 12 can be prepared from ceramic or polymer materials. In one embodiment, the heat-resisting substrate circuit board 15 extends from the tip 111 to the interior of the handle 12. Alternatively, the heat-resisting substrate circuit board 15 extends from the cylindrical portion 112 to the interior of the handle 12. In one embodiment, the first communication module 151 can also be installed on the heat-resisting substrate circuit board 15. Alternatively, the first communication module 151 can be installed on a common circuit board separate from the heat-resisting substrate circuit board 15. Heat-resisting substrate circuit board 15 can withstand high temperatures. When inserting temperature probe 1 into food, as handle 12 is exposed to high temperatures, setting the circuit board inside handle 12 as a ceramic substrate is beneficial for improving the high-temperature resistance of temperature probe 1. Heat-resisting substrate circuit board is a ceramic substrate circuit board or a heat-resisting polymer material substrate circuit board. The circuit board can withstand temperatures above 200° C., preferably between 200-500° C. or 200-400° C. Traditional circuit boards cannot withstand high temperatures. If the circuit board is placed at the top of temperature probe 1 or inside handle 12, the application of the temperature probe 1 will be limited. Setting the heat-resisting circuit board at the upper end of temperature probe 1 or inside handle 12 and placing the antenna on the circuit board will allow temperature probe 1 to be equipped without the need for a copper tube antenna, simplifying the structure of temperature probe 1 while not affecting its signal transmission.

As shown in FIGS. 1 and 4, the cylinder 11 includes an indicator line 114, and a portion from the indicator line to the tip 111 is inserted into the food during temperature measurement by the temperature probe 1.

Figure 5:
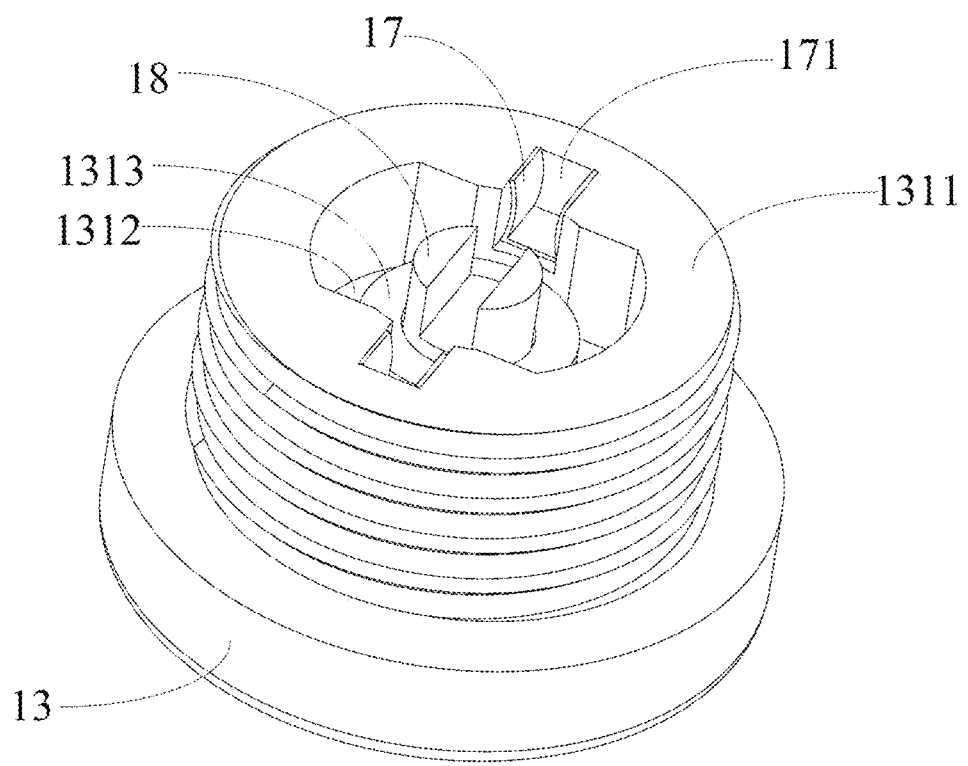
FIG. 5 shows a three-dimensional view of the upper cover of the temperature probe of the present application.

As shown in FIGS. 4 and 5, the handle 12 also has a first channel 123, which runs through the distal opening 121 and the proximal opening 122. The antenna module 16 is located in the first channel 123 of handle 12. During the use of temperature probe 1, this setting of antenna module 16 facilitates the transmission of signals to and from handle 12. The first battery 14 can be a capacitor, and the first battery 14 is located at the tip 111 of the cylinder 11. When the temperature probe 1 is inserted into the food for temperature measurement, it can alleviate the negative impact of the high temperature environment on the first battery 14.

As shown in FIGS. 4 and 5, the peripheral portion 1311 is provided with one or more accommodating cavities 171 at one end near the heat-resisting substrate circuit board 15, which are configured to accommodate the first electrode 17. In one embodiment, the peripheral portion 1311 is provided with two opposite accommodating cavities 171 at one end near the heat-resisting substrate circuit board 15. One end of the first electrode 17 and the second electrode 18 are respectively electrically connected to the heat-resisting substrate circuit board 15, and the other end of the first electrode 17 and the second electrode 18 are respectively electrically connected to the peripheral portion 1311 and the circular portion 1313. The first electrode 17 can be an elastic clip used to hold a heat-resisting substrate circuit board. The second electrode 18 is a U-shaped clamping arm, and the heat-resisting substrate circuit board 15 is fixed by the first electrode 17 and the second electrode 18 together.

As shown in FIG. 4, the temperature probe 1 further includes one or more food temperature sensors 19, which are electrically connected to the heat-resisting substrate circuit board 15 and extend to the inner wall of the cylinder 11. The food temperature sensor 19 includes an elastic arm 191 connected to the heat-resisting substrate circuit board 15 and a sensing unit 192 connected to the elastic arm. The sensing unit 192 is close to the inner wall of the cylinder 11, and preferably, the sensing unit 192 is tightly attached to the inner wall of the cylinder 11. When there are multiple food temperature sensors 19, the food temperature sensors are positioned at different heights of the cylinder 11. Preferably, a thermal conductive silicone layer is provided between the sensing unit 192 and the inner wall of the cylinder 11.

Figure 6:
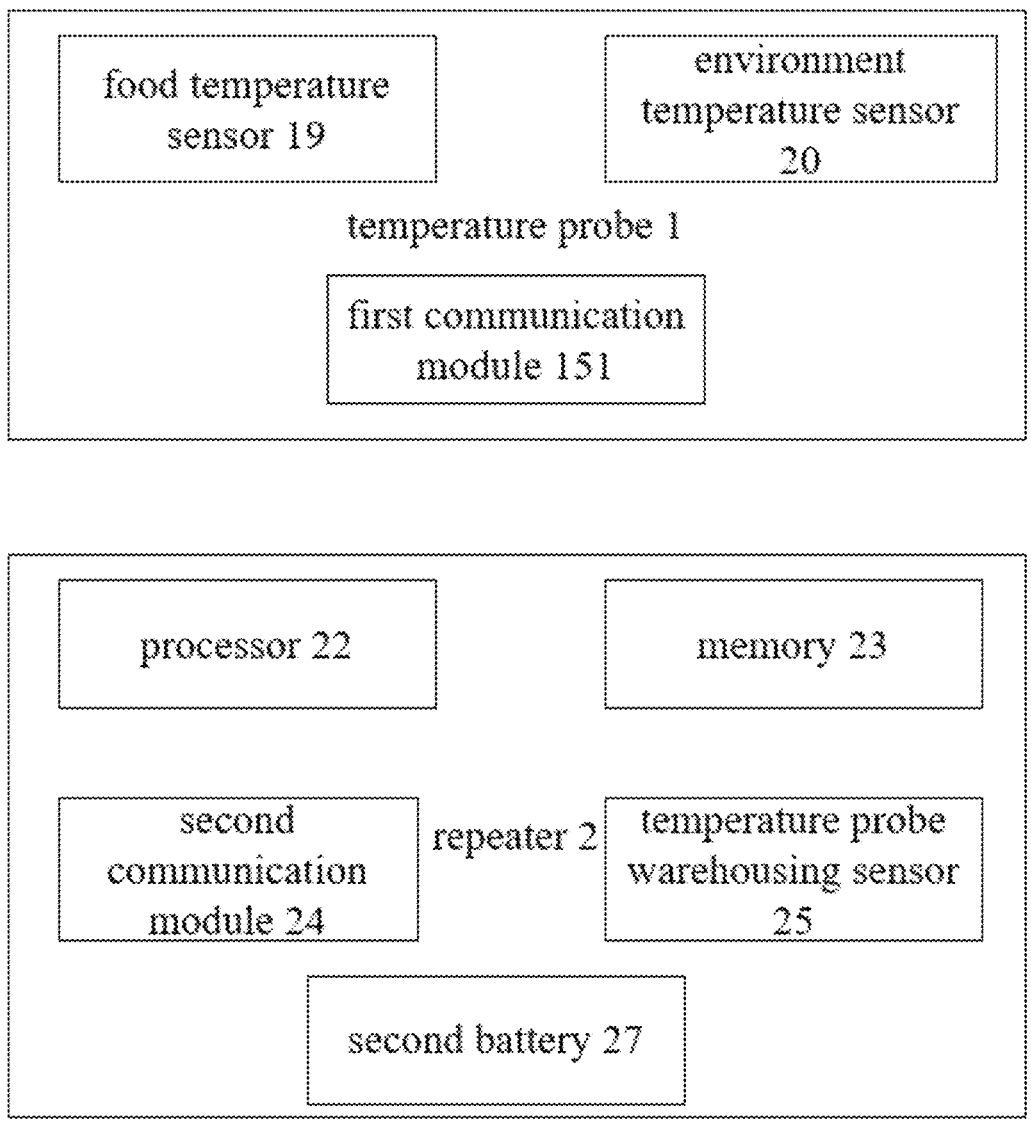
FIG. 6 shows the functional modules of the temperature measurement device of the present application.
Figure 7:
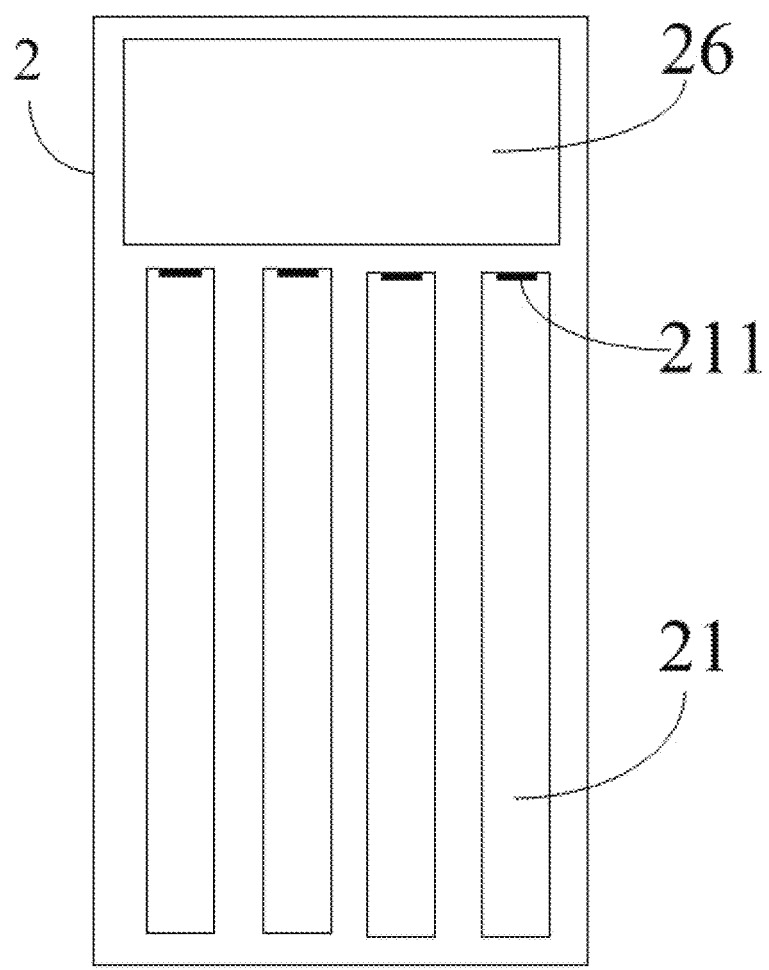
FIG. 7 shows the repeater of the temperature measurement device of the present application.

As shown in FIGS. 6 and 7, the temperature measurement device has repeater 2 detachably connected to temperature probe 1. Repeater 2 is configured to charge temperature probe 1, receive data transmitted from temperature probe 1, perform data processing, and transmit control commands from repeater 2 to temperature probe 1. Due to the small battery capacity of temperature probe 1, it cannot perform intensive data processing and calculations. Therefore, the temperature measurement device is configured with a processor 22 on repeater 2 for data processing and command sending. Repeater 2 has one or more slots 21 for accommodating temperature probe 1. Repeater 2 has a processor 22, a memory 23, and a second communication module 24. The first communication module 151 is communicated with the second communication module 24. Multiple food temperature sensors 19 transmit the measured temperature to the second communication module 24 and processor 22 through the first communication module 151 and antenna module 16. The processor 22 processes the temperature by a temperature algorithm stored in the memory 23. Repeater 2 also includes a display screen 26, which is used to display the real-time temperature, power, working time, etc. transmitted by temperature probe 1. Repeater 2 can be connected to mobile devices through a second communication module 24, such as Bluetooth or WIFI, thereby increasing the distance for users to use temperature probes. Specifically, when the user needs to remotely operate temperature probe 1, a mobile device such as a mobile phone, iPad, etc. can be connected to the second communication module 24. Temperature probe 1 will transmit the obtained food temperature and environment temperature to repeater 2, which in turn will transmit the information to the mobile device.

As shown in FIG. 6, temperature probe 1 also includes an environment temperature sensor 20, which is located at the upper end of cylinder 11. The environment temperature sensor 20 is used to measure the environment temperature. When temperature probe 1 is placed in the oven for use, environment temperature sensor 20 is used to measure the environment temperature in the oven, and temperature probe 1 transmits the environment temperature measured by environment temperature sensor 20 to processor 22 of repeater 2 through the first communication module 151, antenna module 16, and second communication module 24. Memory 23 stores the environment temperature threshold. When the environment temperature measured by environment temperature sensor 20 exceeds the environment temperature threshold, repeater 2 issues an alarm.

The food temperature sensor 19 and the environment temperature sensor 20 transmit the measured temperature through the first communication module 151 and antenna module 16 to the second communication module 24 and processor 22, which processes the temperature through a maturity prediction algorithm stored in memory 23. The first communication module 151 and the second communication module 24 can be one or more of Bluetooth, GSM mobile communication, 3G mobile communication, 4G mobile communication, 2.4 GHz RF communication, 5.8 GHz RF communication, or 433 MHz RF communication.

Repeater 2 also has a temperature probe warehousing sensor 25, which is configured to recognize the electrical level change and output a temperature probe 1 warehousing signal when temperature probe 1 is placed back in slot 21. The temperature probe warehousing sensor 25 transmits the temperature probe 1 warehousing signal to the processor to turn off the first communication module 151 of temperature probe 1.

As shown in FIG. 7, the slot 21 includes a second electrode contact 211 that is matched with the peripheral portion 1311 and the circular portion 1313. The repeater 2 includes a second battery 27, which is electrically connected to the first battery 14 through the second electrode contact 211, the peripheral portion 1311, and the circular portion 1313.

The above is only a preferred embodiment of the present application and is not intended to limit it. Any modifications, equivalent substitutions, and improvements made within the spirit and principles of the present application shall be included within the scope of protection of the present application.

What is claimed is:

1. A temperature measurement device, wherein the temperature measurement device comprises a temperature probe, wherein the temperature probe comprises:

a cylinder and a handle, wherein the handle has a distal opening away from the cylinder, a proximal opening detachably connected to the cylinder and a first channel which runs through the distal opening and the proximal opening, a cross-sectional area of the handle gradually decreases from the distal opening to the proximal opening, the bottom of the proximal opening is provided with a first step that extends radially inward, and the inner diameter $R_d$ of the distal opening is greater than the inner diameter $R_p$ of the first step, the cylinder comprises a tip for inserting into food, a cylindrical portion, and an upper end opposite to the tip, the upper end has a second step that is connected to the cylindrical portion and extends radially outward, the diameter $R_s$ of the second step is greater than the diameter $R_c$ of the cylindrical portion, wherein $R_d>R_s>R_p>R_c$, wherein the temperature probe further comprises an upper cover connected to the distal opening, wherein the upper cover comprises a peripheral portion, an annular portion, and a circular portion, wherein the annular portion is located between the peripheral portion and the circular portion, wherein the annular portion and the circular portion are made of electrically conductive materials, and the annular portion is made of electrical insulating materials, the circular portion and the annular portion are used as electric poles to charge the temperature probe, the electric poles including a positive pole and a negative pole, and the annular portion is used to electrically isolate the circular portion and the annular portion, one end of the peripheral portion near the distal opening is provided with one or more accommodating cavities as a first electrode, and one end of the circular portion near the distal opening is provided with a U-shaped clamping arm as a second electrode, the accommodating cavities and the U-shaped clamping arm are formed as an accommodating channel to clamp one end of a heat-resisting substrate circuit board near the upper cover and an electrically conducting channel to electrically connected the peripheral portion and the circular portion with the heat-resisting substrate circuit board respectively.

2. The temperature measurement device according to claim 1, wherein when the upper end of the cylinder is connected to the proximal opening of the handle, the second step is in contact with the first step.

3. The temperature measurement device according to claim 2, wherein the second step has an external thread, and the proximal opening of the handle has an internal thread that matches the external thread, the internal thread is located above the first step, and the internal thread and the first step form a stop structure of the cylinder.

4. The temperature measurement device according to claim 1, wherein the temperature probe further comprises a first battery, a first communication module, an antenna module, a first electrode, and a second electrode, the antenna module is arranged on the heat-resisting substrate circuit board, the antenna module is located inside the handle.

5. The temperature measurement device according to claim 4, wherein the cylinder comprises an indicator line, and a portion from the indicator line to the tip is inserted into the food during temperature measurement.

6. The temperature measurement device according to claim 4, wherein the temperature probe further comprises one or more food temperature sensors, which are electrically connected to the heat-resisting substrate circuit board and extended to an inner wall of the cylinder.

7. The temperature measurement device according to claim 6, wherein when there are multiple food temperature sensors, the food temperature sensors are positioned at different heights of the cylinder.

8. The temperature measurement device according to claim 6, wherein the food temperature sensor comprises an elastic arm connected to the heat-resisting substrate circuit board and a sensing unit connected to the elastic arm, wherein the sensing unit is close to or abuts against the inner wall of the cylinder.

9. The temperature measurement device according to claim 6, wherein the temperature measurement device further comprises a repeater detachably connected to the temperature probe, wherein the repeater is configured to charge the temperature probe, receive data transmitted from the temperature probe and then perform data processing, and transmit control instructions from the repeater to the temperature probe, the repeater has one or more slots for accommodating the temperature probe, the repeater has a processor, a memory, and a second communication module, the first communication module is communicated with the second communication module, and the multiple food temperature sensors transmit the measured temperature to the second communication module and the processor through the first communication module and the antenna module, the processor processes the temperature by a temperature algorithm stored in the memory.

10. The temperature measurement device according to claim 9, wherein the temperature probe further comprises an environment temperature sensor, which is located at the upper end of the cylinder.

11. The temperature measurement device according to claim 10, wherein the food temperature probe and the environment temperature sensor transmit the measured temperature to the second communication module and the processor through the first communication module and antenna module, and the processor processes the temperature through a maturity prediction algorithm stored in the memory.

12. The temperature measurement device according to claim 9, wherein the repeater further comprises a temperature probe warehousing sensor, wherein the temperature probe warehousing sensor is configured to recognize an electrical level change and output a temperature probe warehousing signal when the temperature probe is placed back in the slot, and transmit the temperature probe warehousing signal to the processor to turn off the first communication module of the temperature probe.

13. The temperature measurement device according to claim 9, wherein the slot comprises a second electrode contact matched with the peripheral portion and the circular portion respectively, the repeater comprising a second battery, and the second battery is electrically connected to the first battery through the second electrode contact, the peripheral portion, and the circular portion.

14. A temperature measurement device, wherein the temperature measurement device comprises a temperature probe, wherein the temperature probe comprises:

a cylinder and a handle, wherein the handle has a distal opening away from the cylinder, a proximal opening detachably connected to the cylinder and a first channel which runs through the distal opening and the proximal opening, a cross-sectional area of the handle gradually decreases from the distal opening to the proximal opening, the bottom of the proximal opening is provided with a first step that extends radially inward, and the inner diameter $R_d$ of the distal opening is greater than the inner diameter $R_p$ of the first step, the cylinder comprises a tip for inserting into food, a cylindrical portion, and an upper end opposite to the tip, the upper end has a second step that is connected to the cylindrical portion and extends radially outward, the diameter $R_s$ of the second step is greater than the diameter $R_c$ of the cylindrical portion, wherein $R_d > R_s > R_p > R_c$, the temperature measurement device further includes a repeater detachably connected to the temperature probe, wherein the repeater is configured to charge the temperature probe, receive data transmitted from the temperature probe, perform data processing, and transmit control commands from the repeater to the temperature probe, the repeater has one or more slots for accommodating the temperature probe, the repeater has a processor, a memory, and a second communication module, the first communication module is communicated with the second communication module, and the multiple food temperature sensors transmit the measured temperature to the second communication module and the processor through the first communication module and the antenna module, the processor processes the temperature by a temperature algorithm stored in the memory, wherein the temperature probe further comprises an upper cover connected to the distal opening, wherein the upper cover comprises a peripheral portion, an annular portion, and a circular portion, wherein the annular portion is located between the peripheral portion and the circular portion, wherein the annular portion and the circular portion are made of electrically conductive materials, and the annular portion is made of electrical insulating materials, the circular portion and the annular portion are used as electric poles to charge the temperature probe, the electric poles including a positive pole and a negative pole, and the annular portion is used to electrically isolate the circular portion and the annular portion, one end of the peripheral portion near the distal opening is provided with one or more accommodating cavities as a first electrode, and one end of the circular portion near the distal opening is provided with a U-shaped clamping arm as a second electrode, the accommodating cavities and the U-shaped clamping arm are formed as an accommodating channel to clamp one end of a heat-resisting substrate circuit board near the upper cover and an electrically conducting channel to electrically connected the peripheral portion and the circular portion with the heat-resisting substrate circuit board respectively.

15. The temperature measurement device according to claim 14, wherein the temperature probe further comprises a first battery, a first communication module, an antenna module, a first electrode, and a second electrode, the antenna module is arranged on the heat-resisting substrate circuit board, the antenna module is located inside the handle.

\* \* \* \* \*